Patented May 31, 1932

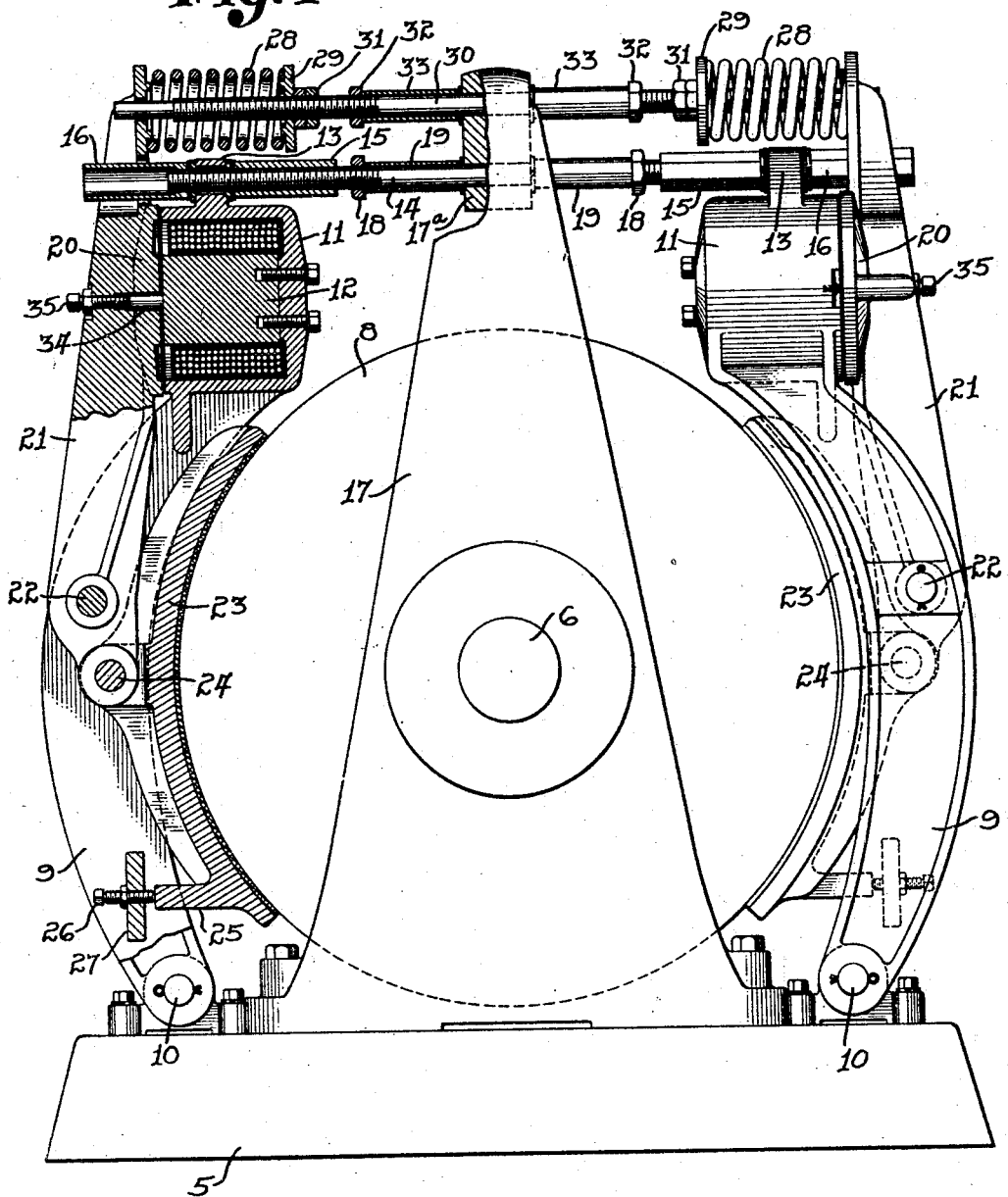

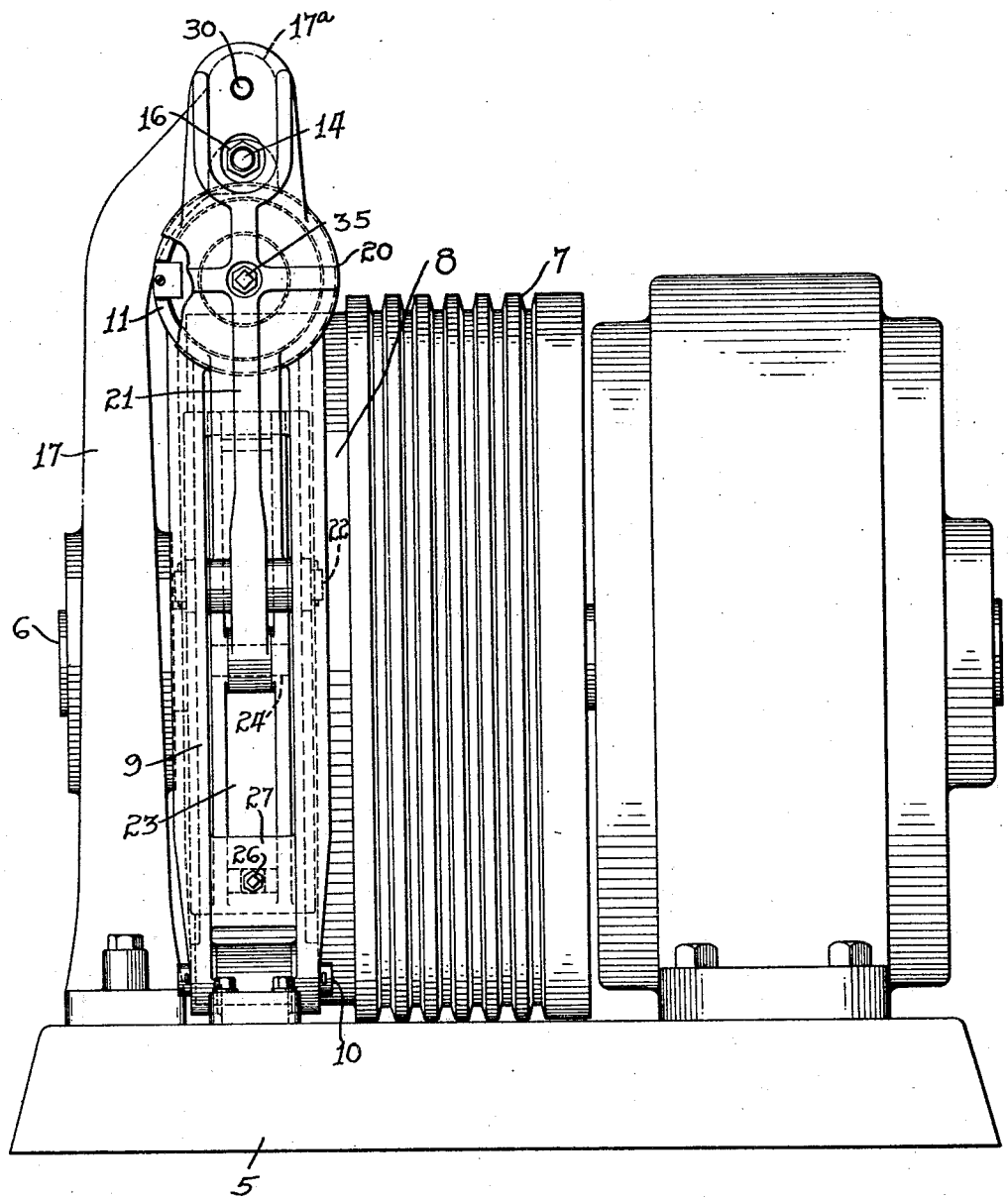

1,860,394

UNITED STATES PATENT OFFICE

FRANK L. OHLER, OF TOLEDO, OHIO, ASSIGNOR TO THE HAUGHTON ELEVATOR & MACHINE COMPANY, OF TOLEDO, OHIO, A CORPORATION OF OHIO

ADJUSTABLE BRAKE STAND

Application filed April 14, 1930. Serial No. 443,949.

This invention relates to an adjustable brake stand, with special reference to the mounting for an electrically controlled elevator brake.

In elevator installations it is customary to provide brakes in which a plurality of shoes are applied to the brake drum by mechanical means, such as springs, and released by an electromagnet. The primary object of the present invention is to provide a simple and inexpensive mounting for a brake of this type. In its present specific embodiment the oppositely disposed frames or arms which carry the electromagnets are so mounted that either one may be independently adjusted about a pivot and then rigidly secured to the support which carries the drum. In a mounting constructed according to my invention, in order to compensate for wear of the brake linings, it is normally necessary to make only a single adjustment on each side. Either brake supporting arm may be released to clean or replace a liner without releasing the opposite supporting arm and without changing the adjustment in any way except for the necessary adjustment to accommodate a new liner.

The invention will be more fully described in connection with the accompanying drawings, in which—

Figure 1 is an end elevation of a drum with the invention applied thereto, the latter being shown partly in elevation and partly in section.

Figure 2 is a front elevation of the same.

The invention is illustrated in connection with an elevator support comprising a base 5 above which is mounted a shaft 6 carrying a cable drum 7 and a brake drum 8. At each side of the brake drum 8 there is a brake supporting frame or arm 9 pivotally mounted at 10, and formed at its upper end with a housing 11 in which is secured an electromagnet 12. The upper side of the housing 11 is formed with an ear 13 by means of which it is adjustably secured to a threaded rod or strut 14 between two nuts or sleeves 15 and 16. The rod 14 is intermediately supported by the overhanging end portion 17ª of an upright 17, which is secured to the base 5 and supports one end of the shaft 6. The rod 14 may be adjusted in the direction of its length and secured in its adjusted position by nuts 18 and spacing sleeves 19.

Each electromagnet 12 has an armature 20 carried by a lever 21, which is fulcrumed at 22 on the arm 9. A brake-shoe 23 is pivoted as at 24 on the lower end of the lever 21, and may be adjusted about the pivot 24 by means of a heel 25, formed at its lower end and engaged by an adjusting screw 26 mounted in a flange 27 formed on the arm or frame 9.

When the power is turned off, the brake-shoe 23 is caused to grip the drum 8 by a force applied to the upper end of the lever 21. In the present instance, this force is applied by means of a coil spring 28 acting against a seat 29, which is adjustable on a threaded rod 30 and is retained in adjusted position by means of lock nuts 31. The rod 30 may, as shown in Fig. 1, be mounted in the overhanging end 17ª of the upright 17 and may be adjusted in the direction of its length and secured by nuts 32 and spacing sleeves 33. This mounting for the rod 30, however, is not essential to the fundamental features of the invention.

In order to avoid the retention of the armature 20 by residual magnetism after the current has been turned off, close contact of the armature with the magnet is prevented by means of a fiber block 34 mounted in the arm 21 and adjustable by means of a screw 35.

It is to be noted that the rod 14, magnets 12 and arms 9 are normally secured in fixed relation to the drum 8, and the operation of the brake-shoes 23 is effected by means of the levers 21. There are only two working joints, 22 and 24, on each side. After the shoes 23 have been properly adjusted by means of the screws 26 it is normally necessary, to compensate for the wear on the liners, only to make a single adjustment on each side, i. e., the adjustment of the upper end of the arm 9 longitudinally of the rod 14. The tension of the springs 28 in relation to the power exerted by the electromagnets may, of course, be adjusted by means of the nuts 31. In case it is necessary to clean or replace a liner it is only necessary to remove the nut 16 on either side, whereupon the arm 9 and the brake-shoe carried thereby may be swung outwardly away from the drum without disturbing the position of the other brake-shoe in any way. The construction, adjustment and operation of a brake in accordance with the invention is, therefore, quite simple and comparatively inexpensive.

While I have shown and described one specific embodiment of the invention, it is to be understood that the invention includes all such modification as may fall within the scope of the appended claims.

What I claim is:

1. In combination, a brake drum, pivotally mounted brake supporting members at opposite sides thereof, means for fixing the position of said supporting members, levers fulcrumed on said supporting members, brake-shoes carried by said levers, and means for actuating said levers to set or release brakes.

2. In combination, a brake drum, pivotally mounted brake supporting members at opposite sides thereof, means supported independently of the brake supporting members for adjusting the distance between the latter, levers fulcrumed on said supporting members, brake-shoes carried by said levers, and means for actuating said levers to set or release the brakes.

3. In combination, a brake drum, pivotally mounted brake supporting members at opposite sides thereof, means for independently adjusting either of said brake supporting members toward or away from the drum, levers fulcrumed on said supporting members, brake-shoes carried by said levers, and means for actuating said levers to set or release the brakes.

4. In combination, a brake drum, pivotally mounted brake supporting members at opposite sides thereof, means for independently adjusting either of said brake supporting members toward or away from the drum, levers fulcrumed on said supporting members, brake-shoes carried by said levers, and means for adjusting both brake supporting members simultaneously in the same direction.

5. The combination with a brake drum, of an upright supporting one end of the drum, pivotally mounted brake supporting members at opposite sides of the drum, means secured to said upright and fixing the position of said supporting members, levers fulcrumed on said supporting members, brake-shoes carried by said levers, and means for actuating said levers to set or release the brakes.

6. The combination with a brake drum, of an upright supporting one end of the drum, pivotally mounted brake supporting members at opposite sides of the drum, means secured to said upright and supported independently of the brake supporting members for adjusting the distance between the latter, levers fulcrumed on said supporting members, brake-shoes carried by said levers, and means for actuating said levers to set or release the brakes.

7. The combination with a brake drum, of an upright supporting one end of the drum, pivotally mounted brake supporting members at opposite sides of the drum, means secured to said upright for independently adjusting either of said brake supporting members toward or away from the drum, levers fulcrumed on said supporting members, brake-shoes carried by said levers, and means for actuating said levers to set or release the brakes.

8. The combination with a brake drum, of an upright supporting one end of the drum, pivotally mounted brake supporting members at opposite sides of the drum, levers fulcrumed on said supporting members, brake-shoes carried by said levers, means for actuating said levers to set or release the brakes, and means secured to said upright for selectively adjusting said brake supporting members either independently or simultaneously in the same direction.

9. The combination with a brake drum, of an upright supporting one end of the drum, brake supporting members at opposite sides of the drum, a strut secured to said upright above the drum and transversely thereof, means for securing said brake supporting members to the strut, levers fulcrumed on said supporting members, brake-shoes carried by said levers, and means for actuating said levers to set or release the brakes.

10. The combination with a brake drum, of an upright supporting one end of the drum, pivotally mounted brake supporting members at opposite sides of the drum, a strut secured to said upright above the drum and transversely thereof, means associated with said strut for adjusting the distance between the brake supporting members, levers fulcrumed on said supporting members, brake-shoes carried by said levers, and means for actuating said levers to set or release the brakes.

11. The combination with a brake drum, of an upright supporting one end of the drum, pivotally mounted brake supporting members at opposite sides of the drum, a strut secured to said upright above the drum and transversely thereof, means associated with said strut for independently adjusting either of said brake supporting members toward or away from the drum, levers fulcrumed on said supporting members, brake-shoes carried by said levers, and means for actuating said levers to set or release the brakes.

12. The combination with a brake drum, of an upright supporting one end of the drum, pivotally mounted brake supporting members at opposite sides of the drum, a strut secured to said upright above the drum and transversely thereof, means for securing said brake supporting members to the strut, levers fulcrumed on said supporting members, brake-shoes carried by said levers, means for actuating said levers to set or release the brakes, and means for adjusting said strut in the direction of its length to adjust both of said brake supporting members simultaneously in the same direction.

13. The combination with a brake drum, brake supporting members at opposite sides of said drum, interconnected means for simultaneously adjusting said supporting members toward or away from the drum, levers fulcrumed on said supporting members, brake-shoes carried by said levers, and means including electromagnets carried by the respective brake supporting members to set or release the brakes.

14. The combination with a brake drum, brake supporting members at opposite sides thereof, interconnected means for simultaneously adjusting both of said supporting members in the same direction transversely of the drum, levers fulcrumed on said supporting members, brake-shoes carried by said levers, and means including electro-magnets carried by the respective brake supporting members to set or release the brakes.

15. The combination with a brake drum, brake supporting members at opposite sides of the drum, means for adjusting said supporting members either simultaneously or individually toward or away from the drum, levers fulcrumed on said supporting members, and means including electromagnets carried by the respective brake supporting members to set or release the brakes.

16. The combination with a brake drum, brake supporting members at opposite sides of the drum, means for adjusting said supporting members either individually toward and away from the drum or simultaneously in the same direction transversely of the drum, levers fulcrumed on said supporting members, brake-shoes carried by said levers, and means including electromagnets carried by the respective brake supporting members to set or release the brakes.

In testimony whereof I have hereunto signed my name to this specification.

FRANK L. OHLER.